United States Patent
Schleiffer et al.

(10) Patent No.: US 10,358,608 B2
(45) Date of Patent: Jul. 23, 2019

(54) PROCESS FOR HYDROCRACKING HEAVY OIL AND OIL RESIDUE

(71) Applicant: BP EUROPA SE., Hamburg (DE)

(72) Inventors: Andreas Schleiffer, Lauenbruck (DE); Hong Yang, San Diego, CA (US)

(73) Assignee: BP Corporation North America Inc., Houston, TX (US)

(*) Notice: Subject to any disclaimer, the term of this patent is extended or adjusted under 35 U.S.C. 154(b) by 0 days.

(21) Appl. No.: 15/115,836

(22) PCT Filed: Feb. 12, 2015

(86) PCT No.: PCT/EP2015/053012
§ 371 (c)(1),
(2) Date: Aug. 1, 2016

(87) PCT Pub. No.: WO2015/121373
PCT Pub. Date: Aug. 20, 2015

(65) Prior Publication Data
US 2017/0175012 A1  Jun. 22, 2017

Related U.S. Application Data

(60) Provisional application No. 61/939,019, filed on Feb. 12, 2014.

(51) Int. Cl.
| | | |
|---|---|---|
| *C10G 45/00* | (2006.01) | |
| *C10G 45/04* | (2006.01) | |
| *C10G 45/46* | (2006.01) | |
| *C10G 45/60* | (2006.01) | |
| *C10G 47/02* | (2006.01) | |
| *C10G 1/08* | (2006.01) | |
| *B01J 37/06* | (2006.01) | |
| *B01J 21/18* | (2006.01) | |
| *B01J 23/745* | (2006.01) | |
| *B01J 35/10* | (2006.01) | |
| *B01J 37/20* | (2006.01) | |

(52) U.S. Cl.
CPC .............. *C10G 47/02* (2013.01); *B01J 21/18* (2013.01); *B01J 23/745* (2013.01); *B01J 35/109* (2013.01); *B01J 35/1019* (2013.01); *B01J 35/1061* (2013.01); *B01J 35/1095* (2013.01); *B01J 37/06* (2013.01); *C10G 1/08* (2013.01); *C10G 45/00* (2013.01); *C10G 45/04* (2013.01); *C10G 45/46* (2013.01); *C10G 45/60* (2013.01); *B01J 37/20* (2013.01); *C10G 2300/70* (2013.01); *C10G 2300/703* (2013.01)

(58) Field of Classification Search
CPC ... C10G 47/02; C10G 45/00; C10G 2300/703
See application file for complete search history.

(56) References Cited

U.S. PATENT DOCUMENTS

| | | | |
|---|---|---|---|
| 3,617,505 A | 11/1971 | Cole et al. | |
| 4,001,105 A * | 1/1977 | Gifford, II | C10G 1/08 201/12 |
| 5,064,523 A * | 11/1991 | Kretschmar | C10M 175/0041 208/112 |
| 5,358,634 A * | 10/1994 | Rankel | B01J 21/18 208/213 |
| 5,364,524 A | 11/1994 | Partridge et al. | |
| 5,624,547 A * | 4/1997 | Sudhakar | B01J 21/02 208/143 |
| 5,795,843 A * | 8/1998 | Endo | D01F 9/145 423/447.2 |
| 2005/0115870 A1* | 6/2005 | Fukuyama | B01J 21/18 208/111.3 |
| 2015/0202594 A1* | 7/2015 | Adler | B01J 20/28004 95/134 |

FOREIGN PATENT DOCUMENTS

| | | | |
|---|---|---|---|
| CN | 103059915 | * | 4/2011 |
| CN | 102989486 | | 3/2013 |
| JP | H09-234370 | | 9/1997 |
| RU | 2089596 | | 9/1997 |
| RU | 2109563 | | 4/1998 |

* cited by examiner

*Primary Examiner* — Randy Boyer
*Assistant Examiner* — Juan C Valencia
(74) *Attorney, Agent, or Firm* — Kalim S. Fuzail

(57) ABSTRACT

A process for the hydrocracking of heavy oils and/or oil residues, the process comprising the step of contacting the heavy oils and/or oil residues with a non-metallised carbonaceous additive in the presence of a hydrogen-containing gas at a temperature of from 250° C. to 600° C. wherein the non-metallised carbonaceous additive has an average pore size of at least 2 nm.

9 Claims, No Drawings

PROCESS FOR HYDROCRACKING HEAVY OIL AND OIL RESIDUE

FIELD OF THE INVENTION

This invention relates to processes for hydrocracking heavy oils and oil residues such as vacuum gas oil, atmospheric residue and vacuum residue into substances having smaller molecules of greater utility.

BACKGROUND OF THE INVENTION

Hydroprocessing (which may also be referred to as hydrocracking, hydrotreating, hydroconverting, hydroconversion or hydrogenative cracking/processing/converting/conversion/treating/treatment) of heavy oils and/or oil residues is a known process that may be used to form useful materials from crude oil components that have high initial boiling points (i.e. typically greater than about 385° C. for atmospheric residue, greater than about 525° C. for vacuum residue and between about 350° C. and about 525° C. for vacuum gas oil). In order to make hydroprocessing conditions more economically viable, metal catalysts may be used to facilitate the hydroprocessing. See e.g. U.S. Pat. Nos. 4,770,764, 8,372,776 and US 20110017636. However, such metal catalysts are expensive and may be prone to deactivation. Alternatively, non-metallic (that is to say, non-metallised) carbonaceous materials such as lignite coke may be used as an additive instead of the metal catalysts. See U.S. Pat. No. 5,064,523. Such carbonaceous additives, however, are typically very inefficient at hydroprocessing larger hydrocarbon molecules, including molecules such as asphaltenes, which unfortunately leads to unconverted heavy oils and/or oil residues in the process, and incomplete hydroprocessing (including coke formation). To worsen matters, unprocessed asphaltenes (and coke) may also adhere to additive particles, thus preventing their further utility in the process.

There accordingly remains a need for a process for hydroprocessing heavy oils and oil residues such as vacuum gas oil, atmospheric residue and vacuum residue into substances having smaller molecules of greater utility that simultaneously offers the cost benefits of avoiding metal catalysts alongside improved process efficiency, especially when it comes to hydrocracking asphaltenes.

SUMMARY OF THE INVENTION

Surprisingly, the applicants have now found that the above problems may be addressed by providing a process for the hydrocracking of heavy oils and/or oil residues, the process comprising the step of contacting the heavy oils and/or oil residues with a non-metallised carbonaceous additive in the presence of a hydrogen-containing gas at a temperature of from 250° C. to 600° C., wherein the non-metallised carbonaceous additive has an average pore size of at least 2 nm.

Also surprisingly, the applicants have found that the above problems may be addressed with a non-metallised carbonaceous additive for the hydroprocessing of heavy oils and/or oil residues wherein the non-metallised carbonaceous additive has an average pore size of at least 2 nm and a surface area of at least 300 m$^2$/g.

DETAILED DESCRIPTION OF THE INVENTION

The processes and materials of the present invention relate to the hydroprocessing of heavy oils and/or oil residues. Such processes are known in the art and usually involve reacting the heavy oil or oil residue in the presence of hydrogen at elevated temperature and pressure. Accordingly, the processes of the present invention comprise the step of contacting the heavy oils and/or oil residues with a non-metallised carbonaceous additive in the presence of a hydrogen-containing gas (i.e. as used herein, a gas comprising molecular hydrogen ($H_2$)) at a temperature of from about 250° C. to about 600° C. (preferably to about 500° C.). As used herein "heavy oils or oil residues" refers to heavy and ultra-heavy crudes, including but not limited to residues, coals, bitumen, shale oils, tar sands and the like, and fractions thereof. The heavy oil may therefore be liquid, semi-solid and/or solid. Non-limiting examples of heavy oils that may be subjected to hydroprocessing include Canada Tar sands, vacuum residue from Brazilia Santos and Campos basins, Egyptial Gulf of Suez, Chad, Venezuelan Zulia, Malaysia and Indonesia Sumatra. Other examples of heavy oils and/or oil residues are described elsewhere herein and also include, without limitation, bottom of the barrel and residuum left over from refinery processes. Particular non-limiting examples include atmospheric tower bottoms, which typically have a boiling point of at least about 343° C., vacuum tower bottoms, which typically have a boiling point of at least about 524° C., and residue pitch and vacuum residue which may have a boiling point of about 524° C. or greater.

The upgrade or treatment of heavy oils or oil residues in the presence of hydrogen is generally referred to herein as "hydroprocessing." Hydroprocessing includes any such process including without limitation hydrogenation, hydrotreating, hydroconversion, hydrocracking (including selective hydrocracking), hydroisomerisation, hydrodewaxing, hydrodearomatization, hydrodesulfurization, hydrodenitrogenation, hydrodemetallation. Of particular relevance to the present invention is where hydroprocessing is taken to mean hydroconversion or hydrocracking, i.e. the treating of heavy oils and/or oil residues in order to lower the molecular weight and/or boiling point and/or concentration of asphaltenes in the heavy oils and/or oil residues. In the present process, a non-metallised carbonaceous material is used as an additive in the hydroprocessing.

As used herein the term "non-metallised" includes materials to which no metals from group VB (5) (e.g. V, Nb, Ta), VIB (6) (e.g Cr, Mo, W) and VIII (8) (e.g. Fe, Co, Ni, Ru, Rh, Pd, Os, Ir, Pt) have been added (e.g. loaded) from an external source, such as materials to which no transition metals have been added (e.g. loaded) from an external source, or such as materials to which no metals have been added (e.g. loaded) from an external source. As used herein, the heavy oils and/or oil residues being processed in the present invention may be excluded from the reference to an external source, i.e. it is within the contemplation of the present invention that the additive may scavenge any of the categories of metals above from the heavy oils and/or oil residues e.g. in situ. Commensurately, according to a definition of "non-metallised" as used herein, while the additive may comprise further materials, including metals, the non-metallised carbonaceous material may not have had additional metal added to it (e.g. loaded on to it). It is thus understood and accepted that the raw carbonaceous material may contain metal (e.g. traces of metals such as iron, nickel or vanadium) in its natural state, comparable to a piece of fruit which while not inherently considered metallic or metallised, nonetheless may contain metal atoms (e.g. a banana in its natural state is not ordinarily considered to be "metallised" but is however widely regarded as comprising potassium).

The non-metallised carbonaceous additive used according to the invention may be in any form, for example the additive may comprise, or be selected from one or more of the group consisting of anthracite cokes, lignite cokes, carbon blacks, activated cokes, petroleum cokes, furnace dust, dusts from Winkler gasification of coal, red mud, electrostatic filter dusts, cyclone dusts, and mixtures thereof, while the non-metallised carbonaceous material preferably comprises, or is, a lignite coke. Although essentially interchangeable herein, especially in respect of features or properties of the two species, the term "additive" typically refers to the species once prepared for use in a process according to the present invention, while "material" typically refers to either a substance of which the additive (once prepared) is composed, or to the additive prior to such preparation for a process according to the present invention.

According to a first aspect of the present invention, the non-metallised carbonaceous additive has an average pore size of at least about 2 nm, preferably at least about 2.25 nm, more preferably at least about 2.5 nm and even more preferably still at least about 3 nm, for example from about 2 nm to about 10 nm, preferably from about 2.25 nm to about 8 nm, more preferably from about 2.5 nm to about 6 nm and even more preferably from about 3 nm to about 5 nm. As used herein, the term "average pore size" refers to the average internal radius of the pores in the carbonaceous materials. Correspondingly, "pore size" or "pore sizes" refers to an internal radius/internal radii respectively, for example as measured for a given pore or set of pores. Without wishing to be bound by theory, the applicants believe that adopting the pore sizes above facilitates access of asphaltene and other large hydrocarbons into the additive in order to promote the hydroprocessing of these larger molecules. The ranges may also be bounded at the upper end because too big a pore size may reduce the overall surface area and physical strength of the additive, thus potentially may be detrimental to the efficacy of the non-metallised carbonaceous additive. Pore sizes as described herein may in turn enable the use of milder conditions for the hydroprocessing step. While large hydrocarbon molecules such as asphaltenes may be cracked using severe conditions, the use of more severe conditions also results in a greater prevalence of small hydrocarbon molecules in the hydroprocessing product, which is undesirable on two counts. Firstly, the smaller molecules (e.g. methane and ethane) are undesirable per se for the reason that they lack value compared to larger hydrocarbon molecules (e.g. octane and decane) because of the lower energy density, and secondly the hydrogen to carbon ratio is higher for smaller molecules, meaning that more hydrogen is consumed during the hydroprocessing process, hence being wasteful and increasing the costs associated with the process.

Pore sizes, including average pore size, (and specific surface area) of the non-metallised carbonaceous additive may be measured by the well established Brunauer-Emmett-Teller (BET) method (ASTM D3663 (e.g. version 03, reapproved 2008)), which evaluates the external surface area, pore sizes and surface area inside the pores of a porous material via the nitrogen multilayer adsorption/desorption isotherm at liquid nitrogen temperature (e.g. −196° C.). As used herein, "total pore volume" is the overall pore volume measured for the material determined using the BET method. The Barrett-Joyner-Halenda (BJH) method is used to evaluate pore size distribution from the experimental desorption isotherms. As used herein "cumulative pore volume" is the aggregated pore volume for the material determined using the BJH method.

The presence of larger pores in the non-metallised carbonaceous additive is considered to be particularly advantageous. Without wishing to be bound by theory, the Applicants believe that increasing the proportion of larger pores increases the capability of the additive to process asphaltenes as they are able to enter additive particles rather than merely adhere to the surface where the large asphaltene molecules may simply block one or more pores. Accordingly, and this may be in combination with any of the average pore sizes disclosed above, the pore size distribution advantageously may extend up to about 50 nm or up to about 30 nm. So, for example, the pore size distribution may advantageously extend to about 40 nm, by which is meant the highest recorded value of a pore size is about 40 nm (and correspondingly for other values). Alternatively, the pore size distribution may extend between two values (i.e. the pore size distribution may have a lowest recorded value and a highest recorded value). Non-limiting examples of such advantageous pore size distributions may be those that extend from about 1.5 nm to about 50 nm, or preferably extending from about 2 nm to about 30 nm. A further advantageous aspect of the pore size distribution may be an increased proportion of larger pores, such as the presence of pores with a pore size of at least about 5 nm, or at least about 8 nm, or at least about 10 nm. The pore size distribution typically has at least one mode, and advantageously has at least two modes (i.e. maxima in the distribution located at particular pore sizes), for example 2, 3, 4, 5, 6, 7, 8, 9 or more modes.

Another way of considering pore size distribution is via the proportion of the pore volume in the material as a whole that arises from pores of certain sizes. Some examples according to the present invention include non-metallised carbonaceous additives wherein at least about 80% of the cumulative pore volume arises from pores having a pore size of at least about 2 nm, additionally or alternatively non-metallised carbonaceous additives wherein at least about 50% of the cumulative pore volume arises from pores having a pore size of at least about 5 nm, additionally or alternatively non-metallised carbonaceous additives wherein at least about 30% of the cumulative pore volume arises from pores having a pore size of at least about 10 nm, and additionally or alternatively non-metallised carbonaceous additives wherein at least about 50% of the cumulative pore volume arises from pores having a pore size of at least about 10 nm, or any combination thereof, based upon cumulative pore volume as measured by BJH (i.e. the sum of pore volume for all pores as determined using this method).

By way of further non-limiting examples of pore size distributions, at least about 90% of the cumulative pore volume may arise from pores having a pore size of at least about 2 nm, additionally or alternatively at least about 75% of the cumulative pore volume may arise from pores having a pore size of at least about 5 nm, additionally or alternatively about 50% of the cumulative pore volume may arise from pores having a pore size of at least about 10 nm, or any combination thereof.

The various ranges described above in relation to pore sizes may also form any arithmetically sensible combination. So, to provide a non-limiting example of one such possible combination, a non-metallised carbonaceous additive according to the invention may have a pore size distribution extending to 30 nm, 30% of the cumulative pore volume arising from pores having a pore size of at least 10 nm and 75% of the cumulative pore volume arising from pores having a pore size of at least 5 nm.

The non-metallised carbonaceous additive as used in the present invention may advantageously have a total pore volume (measured according to the BET method (ASTM D3663 (e.g. version 03, reapproved 2008))) greater than that of the carbonaceous material forming the non-metallised carbonaceous additive, i.e. greater than the total pore volume when the material is in its natural form. The total pore volume may range from about 0.1 cm$^3$/g to about 5 cm$^3$/g, preferably from about 0.2 cm$^3$/g to about 2 cm$^3$/g, more preferably from about 0.3 cm$^3$/g to about 1.5 cm$^3$/g, even more preferably from about 0.5 cm$^3$/g to about 1.25 cm$^3$/g and even more preferably still from about 0.7 cm$^3$/g to about 1 cm$^3$/g. Without wishing to be bound by theory, the Applicants believe that such total pore volumes provide more space for hydrocarbon molecules to diffuse into the additive, hence further improving efficacy.

Further, the non-metallised carbonaceous additive may advantageously have a specific surface area (measured according to the BET-method) greater than that of the carbonaceous material forming the non-metallised carbonaceous additive, i.e. greater than the specific surface area when the material is in its natural form. The specific surface area may range from about 100 m$^2$/g to about 3000 m$^2$/g, preferably from about 200 m$^2$/g to about 1000 m$^2$/g, more preferably from about 300 m$^2$/g to about 800 m$^2$/g, even more preferably from about 350 m$^2$/g to about 700 m$^2$/g, such as from about 400 m$^2$/g to about 650 m$^2$/g. Without wishing to be bound by theory, such specific surface areas provide increased availability of additive surface to promote hydroprocessing of heavy oils and/or oil residues. High surface area may, particularly in combination with any of the aspects of pore size distribution described herein, also mean less additive is required for equivalent hydroprocessing efficiency.

The non-metallised carbonaceous additive used in the present invention is advantageously a powder. Within the present invention, this powder may in principle have any particle size. Desirably, the particle size is from about 1 μm to about 100 μm, preferably from about 10 μm to about 90 μm, more preferably from about 20 μm to about 80 μm, even more preferably from about 30 μm to about 70 μm and even more preferably still from about 40 μm to about 60 μm.

As considered in the definition of "non-metallised" herein, the non-metallised carbonaceous additive may inherently comprise some metal. Without wishing to be bound by theory, the applicants believe that some metals, particularly transition metals such as iron may improve hydroprocessing by catalysing the cracking of hydrocarbons (either directly or by acting as catalyst precursors). Accordingly, the non-metallised carbonaceous additive (especially coke and more especially lignite coke) thus advantageously comprises (e.g. inherently comprises) at least about 6000 ppm of metal, such as from about 6000 ppm to about 100000 ppm, preferably from about 7000 ppm to about 30000 ppm, more preferably from about 8000 ppm to about 20000 ppm, even more preferably from about 9000 ppm to about 15000 ppm and even more preferably still from about 10000 ppm to about 13000 ppm, all by weight of the non-metallised carbonaceous additive. Preferably, any of the ranges above may be applied to the non-metallised carbonaceous additive based only on the amount of transition metals present, more preferably the amount of metals from group VB (5) (e.g. V, Nb, Ta), VIB (6) (e.g Cr, Mo, W) and VIII (8) (e.g. Fe, Co, Ni, Ru, Rh, Pd, Os, Ir, Pt), even more preferably the amount of metals from group VIII (8) and even more preferably still the amount of iron present in the non-metallised carbonaceous additive, all by weight of the non-metallised carbonaceous additive. These ranges may apply to the non-metallised carbonaceous additive without any metal being added (e.g. loaded) from an external source, e.g. in the non-metallised carbonaceous material's natural state.

Alternatively put, this may be achieved simply by selecting the material to be used for the non-metallised carbonaceous additive. Any scavenging of metals from the heavy oils and/or oil residues may be in addition to these ranges or the ranges may describe the metal contents after such scavenging. The ranges may certainly describe the additive at the point of it being brought into contact with the heavy oils and/or oil residues, so for example, after other process steps such as heating in the presence of an oxygen-containing gas and/or treating with an acid described herein, have occurred. Without wishing to be bound by theory, the Applicants believe that while combustible material is typically removed from the non-metallised carbonaceous additive in applying aspects of the present invention as described herein, metal is not, and therefore the proportion of potentially catalytic species in the additive is increased, thus promoting improved process efficiency.

Also according to the present invention, the process for the hydroprocessing of heavy oils and/or oil residues may comprise the steps of: contacting a non-metallised carbonaceous material with an oxygen-containing gas (i.e. a gas comprising molecular oxygen ($O_2$) at a temperature of at least about 120° C. to form a non-metallised carbonaceous additive; (e.g. one with an average pore size according to the present invention) and contacting the heavy oils and/or oil residues with the non-metallised carbonaceous additive in the presence of a hydrogen-containing gas at a temperature of from about 250° C. to about 600° C., under a hydrogen partial pressure of at least about 100 barg. Although the maximum pressure is practically dependent on the equipment used, the hydrogen partial pressure may be up to about 500 barg, up to about 400 barg or up to about 300 barg, for example from about 100 barg to about 500 barg, from about 150 barg to about 400 barg or from about 200 barg to about 300 barg. It is noted that a distinct heating process may have been used in order to form the non-metallised carbonaceous material (i.e. a potential additive in an untreated form according to the present invention). A non-limiting example of this is that heating may be used to form a coke (a non-metallised carbonaceous material), but then according to the present invention, a further heating step may be utilised in order to turn that coke into a non-metallised carbonaceous additive according to the invention. A heating step within the present invention (e.g. to form the non-metallised carbonaceous additive) may therefore be viewed as separate to any heating used to form the non-metallised carbonaceous material (e.g. separated by a cooling step such as a step of cooling the non-metallised carbonaceous material to ambient temperature). By way of another non-limiting example, a heating step may be co-located with the hydroprocessing step (e.g. on the same worksite).

It may be found that in its natural state, the average pore size of a non-metallised carbonaceous material (e.g. lignite coke) is not only less than about 2 nm but also accompanied by a narrow pore size distribution, such as a pore size distribution with few larger pores. The applicants have now found that heating the non-metallised carbonaceous material in the presence of an oxygen-containing gas (herein "heated oxidation") increases the average pore size and broadens the pore size distribution, providing the benefits of the present invention. Advantageously, the heating is to a temperature above about 120° C., preferably from about 200° C. to about 600° C., more preferably from about 250° C. to about 450° C., even more preferably from about 300° C. to about 400° C. and even more preferably still from about 330° C. to about 370° C., and the duration of the heating in the presence of an oxygen containing gas is at least about 1 hour, preferably at least about 2 hours, more preferably at least about 3 hours and even more preferably at least about 4 hours, for example from about 1 hour to about 24 hours, from about 2 hours to about 12 hours, from about 3 hours to about 10 hours or from about 4 hours to about 5 hours. Alternatively, the process step of heating the non-metallised carbonaceous material in the presence of an oxygen-containing gas may be continuous. The oxygen-containing gas may advantageously be oxygen, a nitrogen-oxygen mixture or air, and is preferably air. It should be noted that any combination of temperature range, duration and oxygen-containing gas identity may be used and is intended to be included in the present disclosure. Without wishing to be bound by theory, the applicants understand that the heated oxidation according to the above description facilitates the removal of combustible material and/or ash from inside the pores of the non-metallised carbonaceous material, thus increasing the average pore size and increasing the availability of trace metals (for example iron) which may catalyse (either directly or via functioning as a pre-catalyst) the hydroprocessing step.

In accordance with some desirable embodiments, the pressure of the oxygen-containing gas during the heated oxidation may in principle be of any suitable level provided some oxygen-containing gas is present. Non-limiting examples of the pressures of the oxygen-containing gas that may be used include from about −999 mbarg to 20 barg, from about −500 mbarg to about 10 barg, from about −250 mbarg to about 5 barg, from about −200 mbarg to about 2 barg, from about −150 mbarg to about 1 barg or from about −100 mbarg to about 500 mbarg. Ambient pressure (about 0 barg) may therefore be used. Alternatively, the pressures disclosed above may be partial pressures of the oxygen ($O_2$) present in the oxygen-containing gas.

In some advantageous embodiments, the non-metallised carbonaceous material is treated with acid, i.e. the process may comprise a step of contacting the non-metallised carbonaceous material/additive with an acid (herein "acid treatment"), such as in addition to a heated oxidation. Without wishing to be bound by theory, the applicants believe that acid treatment as described above may further remove ash, crystalline graphite and non-metal inorganic material from within the pores of the non-metallised carbonaceous material and may also remove basic metals (such as group 1 and 2 elements, e.g. Na, K, Ca, Mg) which further increases the availability of potentially catalytic metals (e.g. transition metals such as iron) within the hydroprocessing step. The ash content may therefore be no more than (or less than) 20%, preferably no more than (or less than) 15%, more preferably no more than (or less than) 10% and even more preferably no more than (or less than) 5% by weight of the non-metallised carbonaceous additive. A further benefit so arising may be that the additive is softened by the acid treatment, thus reducing erosion in processing equipment (such as the hydroprocessing reactor) that may occur as a result of using a carbonaceous additive.

An acid treatment step may occur before or after a heated oxidation described herein, but is preferably before the heated oxidation as this allows the heated oxidation to additionally remove any residual moisture (i.e. drying the non-metallised carbonaceous additive) from the acid treatment at the same time as increasing the pore size.

In principle any acid may be used for the acid treatment step. Examples of suitable acids include inorganic acids such as tungstic acid, sulphuric acid, phosphoric acid, nitric acid, hydrochloric acid and mixtures thereof as well as organic acids such as citric acid, acetic acid, benzoic acid, salicylic acid and mixtures thereof. Preferably, the acid used for the acid treatment step comprises, or is, an inorganic acid, more preferably the acid comprises, or is selected from sulphuric acid, phosphoric acid, nitric acid, hydrochloric acid and mixtures thereof and even more preferably the acid comprises, or is, nitric acid. Typically, the acid will be provided to the acid treatment as an aqueous solution. The concentration of the acid in such a solution may in principle be any value. For example, the acid may be present in an amount of from about 1% to about 99% by weight of the solution, preferably from about 5% to about 95%, more preferably from about 10% to about 90%, even more preferably from about 20% to about 70%, even more preferably still from about 25% to about 50% and yet more preferably from about 30% to about 35%, all by weight of the solution.

The acid treatment may also be heated (e.g. a heated step), for example the acid treatment may occur at a temperature of from about 25° C. to about 99° C., preferably from about 30° C. to about 95° C., more preferably from about 40° C. to about 90° C., even more preferably from about 50° C. to about 88° C. and even more preferably still from about 70° C. to about 85° C. or from about 75° C. to about 85° C. Advantageously, an acid treatment may also be agitated, e.g. by stirring.

Following the acid treatment step, it may be desirable to rinse the non-metallised carbonaceous additive in order to remove any excess acid that may be present. For example, the non-metallised carbonaceous additive may be rinsed with water (preferably de-ionised water), e.g. until such time as the pH of the rinse water (i.e. water sampled after being used to rinse the additive) is stable.

A further drying step may also follow an acid treatment of the non-metallised carbonaceous additive which may be, for example, heating the non-metallised carbonaceous additive to a temperature of at least about 40° C. for a period of at least about 2 hours. Preferably, the optional drying step may be conducted at about 120° C. for about 12 hours.

It may also be desirable to manage the density of the non-metallised carbonaceous additive in order to improve its mobility within the hydroprocessing step (i.e. mobility physically within a hydroprocessing reactor, as opposed to a tendency to settle) in order to improve overall process efficiency. In particular, and without wishing to be bound by theory, the Applicants understand that the removal of ash by heat and/or acid treatment may lower the density of the non-metallised carbonaceous additive and thus promote overall process efficiency. Accordingly, the true density of the additive advantageously may be from about 1 g/cm³ to about 3 g/cm³, preferably from about 1.7 g/cm³ to about 2 g/cm³. The true density may be measured by He absorption, such as according to ASTM D2638 (e.g. version 10; ASTM D2638-10).

The present processes comprise a step of contacting the heavy oils and/or oil residues with a non-metallised carbonaceous additive in the presence of a hydrogen-containing gas i.e. the hydroprocessing step e.g hydrocracking step. This hydroprocessing step is typically conducted at a temperature of from about 250° C. to about 600° C. or 500° C., preferably from about 400° C. to about 490° C., more preferably from about 425° C. to about 485° C., even more preferably from about 440° C. to about 480° C. and even more preferably still from about 450° C. to about 475° C. It is also usual practice to utilise a hydrogen partial pressure of from about 50 barg to about 300 barg, preferably from about 100 barg to about 250 barg.

The non-metallised carbonaceous additive may be present in the hydroprocessing step in an amount of from about 0.1% to about 25% by weight of all solid and liquid materials present in the hydroprocessing step (e.g. not including any gas present). Advantageously, the non-metallised carbonaceous additive may be present in an amount of from about 0.5% to about 15%, preferably from about 0.8% to about 10% and even more preferably from about 1% to about 5%, by weight of the solid/liquid materials present in the hydroprocessing step.

Other additives and/or catalysts may be added in addition to the non-metallised carbonaceous additive according to the present invention. Such additives and/or catalysts may be any known in the art, for example metal catalysts. According to some embodiments of coal liquefaction for example, a catalyst precursor may be used to impregnate ground coal at a rate of about 0.25 to about 5 wt. % of metal to coal (on a dry, ash-free basis or "daf" basis). After impregnation, the catalyst is then formed via in situ sulfidation. In some embodiments, the in situ sulfidation is carried out by mixing elemental sulfur with the catalyst impregnated coal and a solvent or diluent, (e.g. FCC-type process oil(s), light catalytic cycle cracking oil(s) (LCCO), decanted oil(s) (DCO)), at a solvent to coal ratio ranging from about 0.25:1 to about 5:1 or from about 0.5 to about 3:1

The hydroprocessing step may comprise, or be, a plurality of individual hydroprocessing steps (i.e. 2 or more steps, for example 2, 3, 4, 5, 6, 7, 8, 9 or more steps) which may be identical or at least one of which may differ in one or more ways from at least one other.

The hydroprocessing step(s) may in principle be any of those known in the art and is/are in no way limited to particular approaches or equipment. The hydroprocessing may therefore be continuous, batch mode or combinations thereof (for example in the case of a plurality of hydroprocessing steps there may be one or more steps that are continuous and other(s) that operate in batch mode). Similarly one or more hydroprocessing steps may be carried out in a mixing tank and others in a fluidized bed reactor or slurry bed reactor. Single-stage or multiple-stage reactors may also be used to create combinations of hydroprocessing processes and reactor types. In some embodiments, a batch process involving one reactor for multiple steps may be carried out with the steps carried out in sequence after completion of the previous step, or multiple reactors may be in series with each step being carried out in a separate reactor. Non-limiting continuous processes according to the invention include continuous processes in which the product stream from one reactor feeds the next step in the process, whether that is a further reactor, alternative step (e.g. distillation or condensing), or disposal (e.g. as a product stream or waste stream).

Any suitable apparatus known in the art may be used for the present processes. For example, the apparatus may be an ebullating bed reactor, a mixing tank reactor, a fluidized bed reactor, a slurry bed reactor or combinations thereof, including continuously stirred tank reactor variants of any of the foregoing. Stirring (which may be before, during and/or after hydroprocessing) may be achieved by any suitable means known in the art, for example an in-line static mixer (e.g. utilising a plurality of internal baffles or other stirring elements), a dynamic high shear mixer (e.g. a vessel with a propeller for very highly turbulent, high shear mixing), or any combination of the above, in order to obtain turbulent mixing conditions. In some advantageous embodiments, high shear mixing is desirable in order to prevent the mixture from settling or thickening. Accordingly, it may be desirable to obtain mixing conditions for a flow with a Reynolds number of at least about 2000. In some embodiments, the mixing is continuous in a high shear mode (e.g. from about 100 RPM to about 1600 RPM) and may last from about 10 minutes to about 24 hours with the goal of obtaining a homogeneous slurry. The mixing may also be sufficient for a Reynolds number of at least about 3000, or from about 3100 to about 7200.

Any mixing may occur under an inert atmosphere, which may be, by way of non-limiting example: nitrogen, refinery gas, any other gas having little or no oxygen, and any mixtures thereof. The mixing may also be conducted under a hydrogen-containing gas pressure. It may be advantageous to add a surfactant to the heavy oils and/or oil residues (with or without the non-metallised carbonaceous additive) in order to improve processability, or to subject a mixture of non-metallised carbonaceous additive and heavy oil and/or oil residue to activation radiation, for example the mixture may be subjected to high intensity ultrasound or electromagnetic radiation to reduce the particle size of the non-metallised carbonaceous additive in situ.

The heavy oil and/or oil residue (with or without the non-metallised carbonaceous additive) may comprise water (e.g. free water) which may be removed to prevent it occupying space in a hydroprocessing reactor. For example, the heavy oil and/or oil residue (with or without the non-metallised carbonaceous additive) may be passed to a high pressure separator to remove water prior to hydroprocessing. Additionally or alternatively, the heavy oil and/or oil residue (with or without the non-metallised carbonaceous additive) may be pre-conditioned with hydrogen prior to hydroprocessing. The presence of free water may be particularly undesirable as this may lead to foaming in the reactor which then reduces the length of time for which a process may be run continuously.

The non-metallised carbonaceous additive is useful for hydroprocessing carbonaceous feedstocks which include without limitation atmospheric gas oils, vacuum gas oils (VGO), atmospheric residues, vacuum residues, deasphalted oils, olefins, oils derived from tar sands or bitumen, oils derived from coal, crude oils (e.g. heavy crude oils), synthetic oils from Fischer-Tropsch processes, and oils derived from recycled oil wastes and polymers. The non-metallised carbonaceous additive is useful for, but not limited to, hydrogenation upgrading processes such as thermal hydrocracking, hydrotreating, hydrodesulfurization, hydrodenitrification, and hydrodemetalization. In some further embodiments, the non-metallised carbonaceous additive may be used for pretreating a carbonaceous material and/or for liquefying a carbonaceous material such as coal or mixtures of coal with any other feedstocks mentioned above.

The non-metallised carbonaceous additive can be used to treat a plurality of feeds under wide-ranging reaction conditions such as temperatures of from about 250° C. to about 500° C., hydrogen pressures of from about 5 to about 300 barg or bara (72 to 4351 psi or 0.5 to 30 MPa), liquid hourly space velocities of from about 0.05 to about 10 h$^{-1}$ and hydrogen treat gas rates of from about 35.6 to about 2670 m$^3$/m$^3$ (200 to 15000 SCF/B).

In some embodiments, the hydroprocessing pressure ranges from about 10 MPa (1,450 psi) to about 25 MPa (3,625 psi), from about 15 MPa (2,175 psi) to about 20 MPa (2,900 psi), less than 22 MPa (3,190 psi), or more than 14 MPa (2,030 psi). The liquid hourly space velocity (LHSV) of the feed will generally range from about 0.05 $h^{-1}$ to about 30 $h^{-1}$, about 0.5 $h^{-1}$ to about 25 $h^{-1}$, about 1 $h^{-1}$ to about 20 $h^{-1}$, about 1.5 $h^{-1}$ to about 15 $h^{-1}$, or about 2 $h^{-1}$ to about 10 $h^{-1}$. In some embodiments, LHSV is at least about 5 $h^{-1}$, at least about 11 $h^{-1}$, at least about 15 $h^{-1}$, or at least about 20 $h^{-1}$. In some embodiments, the LHSV ranges from about 0.25 $h^{-1}$ to about 0.9 $h^{-1}$. Also in some embodiments, the LHSV ranges from about 0.1 $h^{-1}$ to about 3 $h^{-1}$. The hydroprocessing temperature may range from about 410° C. (770° F.) to about 600° C. (1112° F.), additionally or alternatively less than about 462° C. (900° F.) and/or more than about 425° C. (797° F.). The hydroprocessing can be practiced in one or more reaction zones and can be practiced in either counter-current flow or co-current flow mode. By counter-current flow mode is meant a process wherein the feed stream flows counter-current to the flow of hydrogen-containing treat gas. By co-current flow mode is meant a process wherein the feed stream flows co-current with the flow of hydrogen-containing treat gas. The hydroprocessing may also include slurry and ebullated bed hydrotreating processes for the removal of sulfur and nitrogen compounds and the hydrogenation of aromatic molecules present in light fossil fuels such as petroleum mid-distillates, e.g., hydrotreating a heavy oil employing a circulating non-metallised carbonaceous additive.

The feeds (i.e. heavy oils and/or oil residues) for use in hydroprocessing processes according to the invention may include but not necessarily be limited to petroleum and chemical feedstocks such as olefins, reduced crudes, hydrocrackates, raffinates, hydrotreated oils, atmospheric and vacuum gas oils, coker gas oils, atmospheric and vacuum resids, deasphalted oils, dewaxed oils, slack waxes, Fischer-Tropsch waxes and mixtures thereof. Specific examples range from the relatively light distillate fractions up to high boiling stocks such as whole crude petroleum, reduced crudes, vacuum tower residua, propane deasphalted residua, brightstock, cycle oils, fluid catalytic cracking (FCC) tower bottoms, gas oils including coker gas oils and vacuum gas oils, deasphalted residua and other heavy oils. In one embodiment, the feedstock is a C10+ feedstock. In another embodiment, the feedstock is selected from distillate stocks, such as gas oils, kerosenes, jet fuels, lubricating oil stocks boiling above 230° C., heating oils, hydrotreated oil stock, furfural-extracted lubricating oil stock and other distillate fractions whose pour point and viscosity properties need to be maintained within certain specification limits. The non-metallised carbonaceous additive may be added directly to the feed before/during hydroprocessing or may be first mixed into a solvent or diluent, (e.g. a petroleum fraction, FCC-type process oil(s), light catalytic cycle cracking oil(s) (LCCO), decanted oil(s) (DCO)).

In some embodiments, the heavy oils and/or oil residues may contain a substantial amount of nitrogen containing compounds, e.g. at least about 10 ppm nitrogen by weight, particularly in the form of organic nitrogen compounds. The heavy oils and/or oil residues can also have a significant sulfur content, e.g. ranging from about 0.1 wt % to about 3 wt %, or higher. In some embodiments, the heavy oils and/or oil residues form a feed derived from crude oils, shale oils and tar sands as well as synthetic feeds such as those derived from Fischer-Tropsch processes, for example having initial boiling points of greater than about 315° C. or higher. Specific non-limiting examples include reduced crudes, hydrocrackates, raffinates, hydrotreated oils, atmospheric gas oils, vacuum gas oils, coker gas oils, atmospheric and vacuum residues, deasphalted oils, slack waxes and Fischer-Tropsch waxes, and mixtures thereof. In some embodiments, the feedstock is a mixture of gas oil from a coker and vacuum distillation from conventional crudes, derived from distillation towers (atmospheric and vacuum), hydrocrackers, hydrotreaters and solvent extraction units, and may have wax contents of up to about 50% or more. Also in some embodiments, the heavy oils and/or oil residues may include mid-distillates from fossil fuels such as light catalytic cycle cracking oils (LCCO); distillates derived from petroleum, coal, bitumen, tar sands, or shale oil; heavy catalytic cracking cycle oils (HCCO), coker gas oils, oils derived from recycled oil wastes and polymers, vacuum gas oils (VGO) and heavier residues, which for example may contain several percent (such as up to about 15%, from about 1% to about 13%, from about 3% to about 10%, from about 5% to about 8% or from about 6% to about 7%) 3+ ring aromatics, particularly large asphaltenic molecules.

In a further aspect, the present invention provides a non-metallised carbonaceous additive for the hydroprocessing of heavy oils and/or oil residues (e.g. comprising a non-metallised carbonaceous material) wherein the non-metallised carbonaceous additive has an average pore size of at least about 2 nm and a specific surface area at least about 300 $m^2/g$. As the additive according to this aspect of the invention is available for use in the processes also according to the invention, any feature or combination of features disclosed in respect of the non-metallised carbonaceous additive (including but not limited to the density, metal content, iron content, particle size, pore size distribution or any other aspect or combinations thereof) herein may be applied to this aspect of the present invention. Similarly, the present invention contemplates the use of such non-metallised carbonaceous additives as described herein for hydrocracking heavy oils and/or oil residues, and processes for the manufacture of such additives, whereby the processes for the manufacture of such additives comprise one or more steps described herein and pertaining to the non-metallised carbonaceous additive, such as the heated oxidation and/or acid treatment of a non-metallised carbonaceous material in order to form the non-metallised carbonaceous additive.

EXAMPLES

Comparative Example A

Powdered lignite coke (such as available from RWE as "reactivity-enhanced pulverized lignite coke") having an average particle size <50 μm was selected as the comparative example and the starting material for Inventive Examples 1 and 2 below.

Inventive Example 1

10 g of powdered lignite coke (average particle size <50 μm) was dried at a temperature of 110° C. for 12 hours before being heat treated in a muff furnace at a temperature of 350° C. for 4 hours under the flow of air.

Inventive Example 2

20 g of powdered lignite coke (average particle size <50 μm) was acid treated in a solution of 100 ml of de-ionized water and 80 ml of 70 wt % nitric acid by stirring at a temperature of 80° C. for a period of 6 hours. The solid was separated and washed with de-ionized water until the pH of the rinse water (sampled after rinsing) was stable. The washed solid was left overnight then dried for 12 hours at 110° C. before being heat treated at 350° C. for 4 hours under the flow of air.

The three examples were each subjected to surface area, pore size and pore volume measurements according to Brunauer-Emmett-Teller (BET) (ASTM D3663) method mentioned above, yielding the following results:

| Example | Average Pore Size (nm) | Surface area (m²/g) | Total Pore volume (ml/g) |
|---|---|---|---|
| A | 1.87 | 292.5 | 0.28 |
| 1 | 3.16 | 471.5 | 0.76 |
| 2 | 6.1 | 405 | 1.1 |

Analysis of the pore size distribution of the examples, based on the Barrett-Joyner-Halenda (BJH) method, yielded the following results:

| | Percentage of cumulative pore volume arising from pores | | |
|---|---|---|---|
| Example | With average pore size at least 2 nm | With average pore size at least 5 nm | With average pore size at least 10 nm |
| A | 56.7 | 37.8 | 23.9 |
| 1 | 81.3 | 58.2 | 31.3 |
| 2 | 90.1 | 77.3 | 52.6 |

Vacuum residue having the properties detailed in the table below was used to test the examples provided above:

| Properties of the vacuum residue | Unit | Value |
|---|---|---|
| API gravity | g/ml | 6.82 |
| Elemental composition | wt % | |
| C | | 84.08 |
| H | | 10.49 |
| N | | 0.48 |
| O | | 0.29 |
| S | | 4.5 |
| Asphaltene | wt % | 17.1 |
| Micro Carbon residue | wt % | 22.5 |
| SIMDIST | | |
| 538° C.+ | wt % | 90 |

Comparative Example B

50±0.1 g of vacuum residue was first added to a 300 ml autoclave, and 1.2 g of the original untreated lignite coke (Example A) was then added to the residue. The autoclave was pressurized with pure hydrogen to 123.14 barg (1786 psig) at room temperature, then the temperature was first increased to 120° C., where it was held under stirring for 30 minutes to disperse the additive. The temperature was then raised to 432° C. (810° F.) and held there for 2 hours under stirring. The extent of conversion (525° C.+) resulting from these conditions was determined (via high temperature simulated distillation via gas chromatography) to be 75-80%. The reactor was then cooled to room temperature. After removal of a smaller aliquot of the sample for simulated distillation analysis, the reactor content including liquid and solids was collected by washing with toluene. The mixture was filtered via a 0.45 μm Teflon filter at room temperature. The solid cake was put into 300 ml of toluene and the mixture was sonicated in a ultra-sonication bath for 45 min to remove any toluene soluble materials left on the solid. The toluene and solid mixture was then filtered again. The coke collected from the filter paper was dried under N₂ flow at 120° C. for at least 3 hours and the mass measured to obtain the final coke yield.

Inventive Example 3

The same procedure as Comparative Example B was used in Inventive Example 4. However, lignite coke treated as described in Inventive Example 1 was used as the additive instead of the untreated lignite coke of Comparative Example A.

Inventive Example 4

The same procedure as Comparative Example B was used in Inventive Example 4. However, lignite coke treated as described in Inventive Example 2 was used as the additive instead of the untreated lignite coke of Comparative Example A.

Results from Comparative Example B and Inventive Examples 3 and 4 are provided in the table below.

| Example | Additive used | Coke yield (wt %) |
|---|---|---|
| B | A | 5.64 |
| 3 | 1 | 3.18 |
| 4 | 2 | 2.17 |

It is clearly demonstrated that the treated lignite coke additives of Inventive Examples 3 and 4 provide a significant advantage to the processes by reducing coke yield compared with Comparative Example B.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern. While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope and spirit of this invention.

The invention claimed is:
1. A process for the hydroprocessing of heavy oils and/or oil residues, the process comprising the steps of:
   (a) contacting a non-metallized carbonaceous additive with an acid;

(b) contacting the non-metallized carbonaceous additive of step (a) with an oxygen-containing gas at a temperature of at least 120° C. to from a non-metallized carbonaceous additive;

(c) contacting heavy oils and/or oil residues with the non-metallized carbonaceous additive of step (b) in the presence of a hydrogen-containing gas at a temperature of from 250° C. to 600° C.;

wherein the non-metallized carbonaceous additive has an average pore size of at least 2 nm wherein the acid is selected from the group consisting of tungstic acid, sulphuric acid, nitric acid, hydrochloric acid, citric acid, acetic acid, benzoic acid, salicylic acid and mixtures thereof.

2. A process according to claim 1, wherein the non-metallized carbonaceous material is contacted with the oxygen containing gas at a temperature of from 200° C. to 600° C.

3. A process according to claim 1 wherein the non-metallized carbonaceous material is contacted with the oxygen containing gas in a batch process for a period of at least 1 hour.

4. A process according to claim 1 wherein the non-metallized carbonaceous material is contacted with the oxygen containing gas in a continuous process.

5. A process according to claim 1, wherein the partial pressure of oxygen in step (i) is from about −999 mbarg to about 20 barg.

6. A process according to claim 1, wherein the non-metallized carbonaceous additive is selected from the list consisting of: anthracite cokes, lignite cokes, carbon blacks, activated cokes, petroleum cokes, furnace dusts, dusts from Winkler gasification of coal, red mud, electrostatic filter dusts and cyclone dusts.

7. A process according to claim 1, wherein the non-metallized carbonaceous additive comprises at least two modes in the pore size distribution.

8. A process according to claim 1, wherein the non-metallized carbonaceous additive has a surface area of from 100 $m^2$/g to 3000 $m^2$/g.

9. A process according to claim 1, wherein the non-metallized carbonaceous additive has a total pore volume of from 0.1 $cm^3$/g to 5 $cm^3$/g.

* * * * *